US008024595B2

(12) United States Patent
Shinto (10) Patent No.: US 8,024,595 B2
(45) Date of Patent: Sep. 20, 2011

(54) SEMICONDUCTOR INTEGRATED CIRCUIT, AND METHOD OF SUPPLYING A CLOCK TO INTERNAL BLOCKS PROVIDED IN A SEMICONDUCTOR INTEGRATED CIRCUIT

(75) Inventor: Yasushi Shinto, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1083 days.

(21) Appl. No.: 11/677,827

(22) Filed: Feb. 22, 2007

(65) Prior Publication Data

US 2007/0208963 A1    Sep. 6, 2007

(30) Foreign Application Priority Data

Mar. 1, 2006  (JP) .................................. 2006-055017

(51) Int. Cl.
*G06F 1/00* (2006.01)
(52) U.S. Cl. ........................................ 713/330; 713/300
(58) Field of Classification Search .................. 713/300, 713/330
See application file for complete search history.

(56) References Cited

U.S. PATENT DOCUMENTS

| 5,670,899 | A | * | 9/1997 | Kohdaka | 326/97 |
| 5,983,339 | A | * | 11/1999 | Klim | 712/200 |
| 6,076,171 | A | * | 6/2000 | Kawata | 713/501 |
| 6,889,331 | B2 | * | 5/2005 | Soerensen et al. | 713/320 |
| 2004/0193935 | A1 | * | 9/2004 | Kato et al. | 713/500 |
| 2005/0268130 | A1 | * | 12/2005 | Naruse et al. | 713/322 |
| 2006/0017475 | A1 | * | 1/2006 | Kazuma | 327/156 |
| 2006/0232316 | A1 | * | 10/2006 | Nomura | 327/291 |
| 2007/0079162 | A1 | * | 4/2007 | Mundada et al. | 713/330 |

* cited by examiner

*Primary Examiner* — Mark Connolly
(74) *Attorney, Agent, or Firm* — Fitzpatrick, Cella, Harper & Scinto (57) ABSTRACT

A semiconductor integrated circuit includes a plurality of internal blocks, a supply unit, and a control unit. The supply unit is configured to supply a clock signal to each of the plurality of internal blocks. The control unit is configured to detect power consumption in the semiconductor integrated circuit and to control the supply unit to start supplying the clock signal to each of the internal blocks one by one if the detected power consumption has stabilized.

8 Claims, 7 Drawing Sheets

SEMICONDUCTOR INTEGRATED CIRCUIT, AND METHOD OF SUPPLYING A CLOCK TO INTERNAL BLOCKS PROVIDED IN A SEMICONDUCTOR INTEGRATED CIRCUIT

BACKGROUND OF THE INVENTION

1. Field of the Invention

The present invention relates to semiconductor integrated circuits and to a method of supplying a clock signal to internal blocks provided in a semiconductor integrated circuit.

2. Description of the Related Art

Owing to micro-miniaturization of circuit elements and a reduction in power supply voltage that have accompanied advances in semiconductor processes in recent years, semiconductor integrated circuits (referred to as an "LSI" hereinafter) have grown larger in size and operate at higher speeds.

Further, in order to reduce power consumption, the general practice is to cut off the supply of voltage to the LSI when the LSI is not operating or to control the supply of a clock to each of the blocks within the LSI. For example, the specification of U.S. Pat. No. 6,076,171 discloses an arrangement in which the clock frequency is changed depending upon the state of the CPU load in order to realize a reduction in power consumption.

While LSIs are increasing in size and are made to operate at high speeds, it is also required that an LSI exhibit a high degree of precision in terms of power supply voltage owing to the use of lower power supply voltages. In LSIs thus far, no problems arise if it is confirmed that a fluctuation in power supply voltage supplied during the operation of the LSI is within the rated range of such voltage fluctuation. However, as the allowable range of fluctuation in supplied voltage narrows due to use of lower power supply voltages, there are instances where the former circuitry that supplies power to the LSI cannot respond, leading to a large fluctuation in voltage, in a case where the power consumed by the LSI changes significantly in accordance with a changeover in the operating state thereof. In conventional arrangements, therefore, one problem is that when there is a large change in LSI power consumption in accordance with a changeover in the operating state, the supplied voltage exceeds the rated range of power-supply voltage fluctuation of the LSI, thereby leading to an LSI malfunction.

As the scale of the LSI gates and the LSI operating frequency increase in the future, it is predicted that the above-mentioned problem will become more conspicuous.

It should be noted that the aforementioned changeover in the operating state includes an on/off changeover in terms of the supply of power supply voltage to the interior of an LSI, a changeover between a normal operation and a power saving mode, and a changeover between a shut-down operation and a power saving mode. The power saving mode includes operation of the circuit at a frequency lower than that of normal operation, and operation only of some functions.

SUMMARY OF THE INVENTION

Accordingly, the present invention provides a technique whereby the range of fluctuation of the power supply voltage will not exceed a predetermined range even in cases where there is a changeover in the operating state of the circuit.

A semiconductor integrated circuit according to the present invention comprises a plurality of internal blocks; and supply unit adapted to supply a clock signal successively to each of the plurality of internal blocks in the course of changing the operating state of the semiconductor integrated circuit from a first state to a second state.

The supply unit supplies the clock signal successively to each of the plurality of internal blocks in such a manner that the power supply voltage supplied from an external power supply circuit will not exceed an allowable range of the power supply voltages of the semiconductor integrated circuit owing to a fluctuation in load accompanying a change in the operating state, by way of example.

Further, the supply unit supplies the clock signal successively to each of the plurality of internal blocks in such a manner that a range of fluctuation in the driving voltage of the semiconductor integrated circuit will not exceed a predetermined range, by way of example.

Another semiconductor integrated circuit according to the present invention comprises an internal block; and a changing unit adapted to change an operating clock frequency of the internal block in a stepwise fashion in the course of changing the operating state of the semiconductor integrated circuit from a first state to a second state.

The changing unit changes the operating clock frequency of the internal block in a stepwise fashion in such a manner that the power supply voltage supplied from an external power supply circuit will not exceed an allowable range of power supply voltages of the semiconductor integrated circuit owing to a fluctuation in the load thereon accompanying a change in the operating state thereof, by way of example.

Further, the changing unit changes the operating clock frequency of the internal block in a stepwise fashion in such a manner that the range of fluctuation in the driving voltage of the semiconductor integrated circuit will not exceed a predetermined range, by way of example.

A method of supplying a clock signal to a plurality of internal blocks provided in a semiconductor integrated circuit according to the present invention comprises a step of supplying a clock signal successively to each of the plurality of internal blocks in the course of changing the operating state of the semiconductor integrated circuit from a first state to a second state.

Further, a method of supplying a clock signal to a plurality of internal blocks provided in a semiconductor integrated circuit according to the present invention comprises a step of changing an operating clock frequency of the internal block in a stepwise fashion in the course of changing the operating state of the semiconductor integrated circuit from a first state to a second state.

Further features of the present invention will become apparent from the following description of exemplary embodiments with reference to the attached drawings.

DESCRIPTION OF THE EMBODIMENTS

An embodiment of the present invention will now be described in detail with reference to the accompanying drawings. It should be noted that the constituents described in this embodiment are exemplary and that the scope of the present invention is not limited solely to these constituents.

First Embodiment

The present embodiment, which relates to an LSI that operates with an external power supply circuit serving as the power supply, will be described with regard to an arrangement that controls a fluctuation in current within the LSI in such a manner that when there is a changeover in the operating state of the LSI, an LSI malfunction will not be caused by a fluctuation in the power supply voltage that accompanies a fluctuation in current within the LSI. It should be noted that a changeover in the operating state includes an on/off changeover in terms of supply of the power supply voltage to the interior of an LSI, a changeover between a normal operation and a power saving mode, and a changeover between a shut-down operation and a power saving mode. In this embodiment, a case where an applied power supply voltage is turned on to supply a system clock signal will be described as one example. As will be described later, by executing similar processing also in the other types of operating-state changeover, control is exercised in such a manner that the range of fluctuation in the power supply voltage will not exceed a predetermined range, thereby enabling a current fluctuation internally of an LSI to be controlled.

Figure 1:
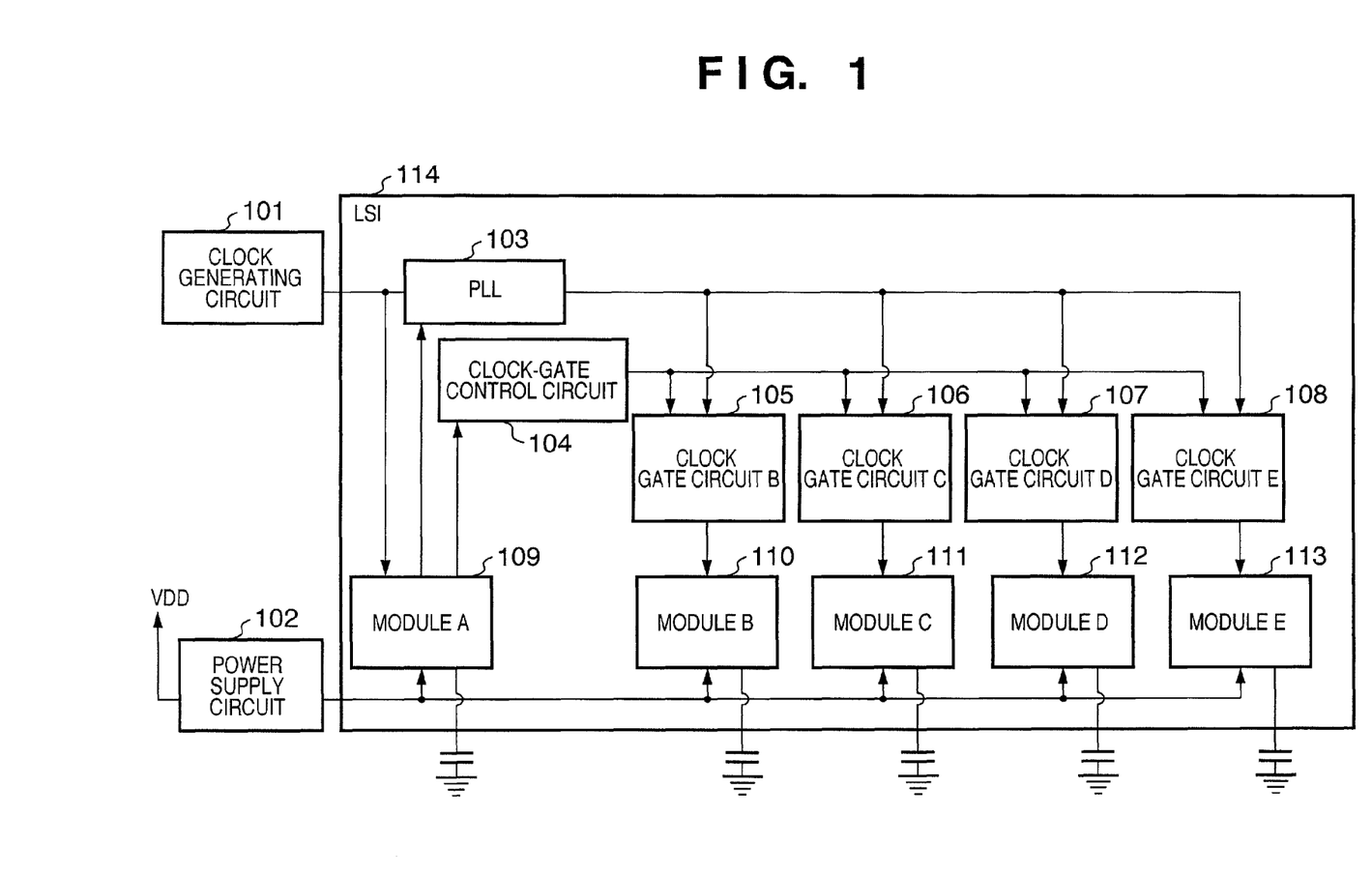
FIG. 1 is a block diagram illustrating the overall configuration of a system according to a first embodiment of the present invention.

FIG. 1 is a block diagram illustrating the overall configuration of a system according to the first embodiment of the present invention. The system according to this embodiment comprises an LSI (Large-Scale Integration) chip 114, a clock signal generating circuit 101 for generating a clock signal supplied to the LSI chip 114, and a power supply circuit 102 for supplying power to the LSI chip 114.

The LSI chip 114 has the following components:

five internal modules A to E (109 to 113);

a PLL (Phase-Locked Loop) 103 serving as output unit adapted to generate and output a high-frequency clock signal based upon a supplied clock (signal) that enters from the clock signal generating circuit 101;

clock gate circuits B to E (105 to 108) for controlling the supply of the clock signal to the modules B to E (110 to 113); and a clock-gate control circuit 104 for controlling the clock gate circuits 105 to 108.

The setting of the PLL 103 and clock-gate control circuit 104 is carried out by the module A 109.

The modules B to E (110 to 113) receive supplied voltage from the power supply circuit 102 and function as an operation unit adapted to execute processing based upon the clock signal. Although this embodiment is described taking as an example a case where there are four modules as an operation unit, the number is not limited to four so long as there are a plurality of the modules.

The module A 109, the clock-gate control circuit 104 and the clock gate circuits B to E (105 to 108) function as supply unit adapted to supply the clock signal, which is output from the PLL 103, to the modules B to E (110 to 113). The module A 109, clock-gate control circuit 104 and clock gate circuits B to E (105 to 108) control the supply of the clock signal to the modules B to E (110 to 113) in such a manner that the range of fluctuation in the driving voltage will not exceed a predetermined range. That is, according to this embodiment, the supply of the clock signal to the modules B to E (110 to 113) is controlled in such a manner that the range of fluctuation in the power supply voltage will not exceed a predetermined range even if there is a changeover in the operating state of the LSI. This prevents an LSI malfunction. In this embodiment, the timing for the supply of the clock signal is controlled for each of the modules B to E (110 to 113), thereby suppressing a sudden fluctuation in the power supply voltage.

Figure 2:
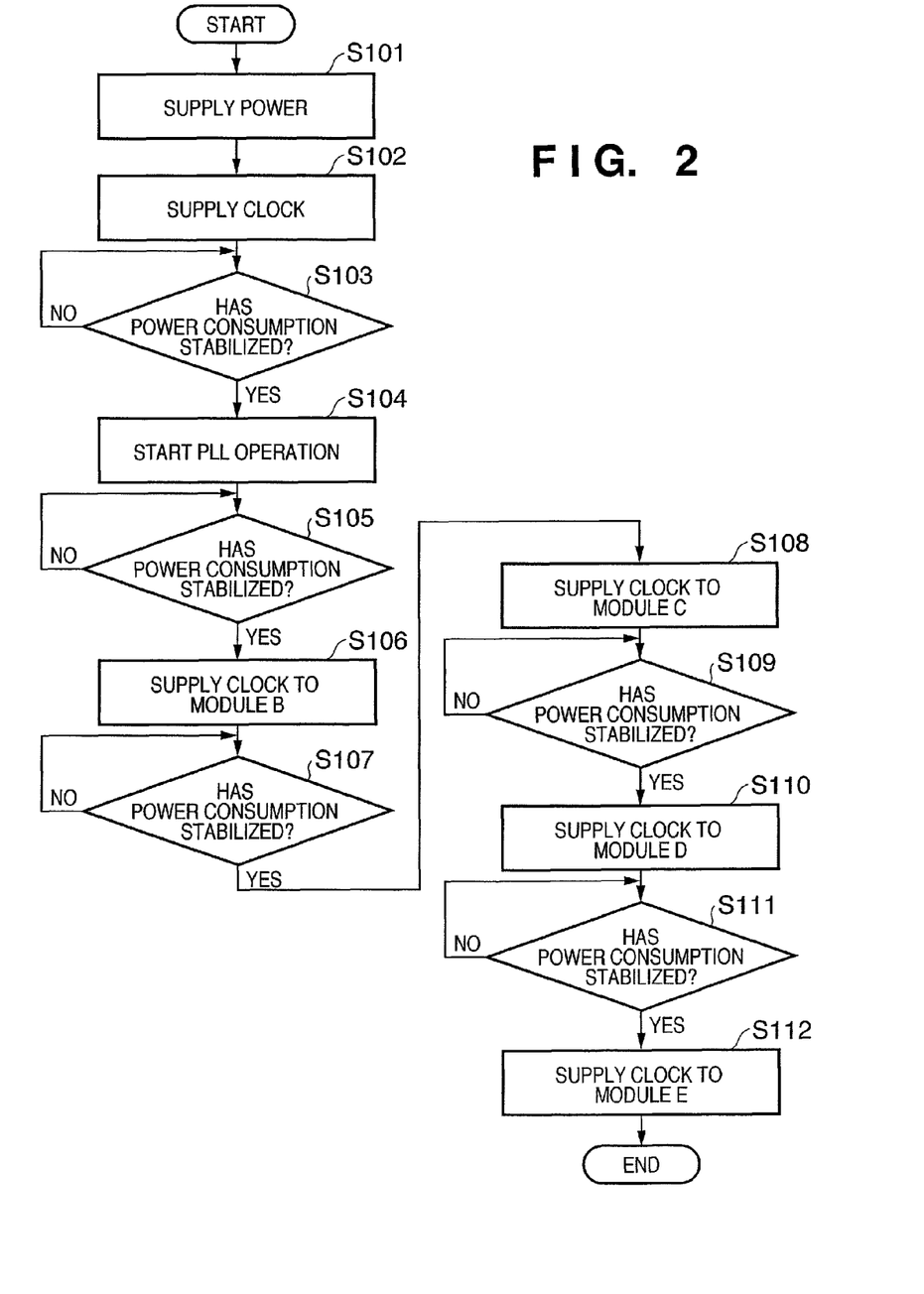
FIG. 2 is a flowchart illustrating processing executed by a module in the system according to the first embodiment.
Figure 3:
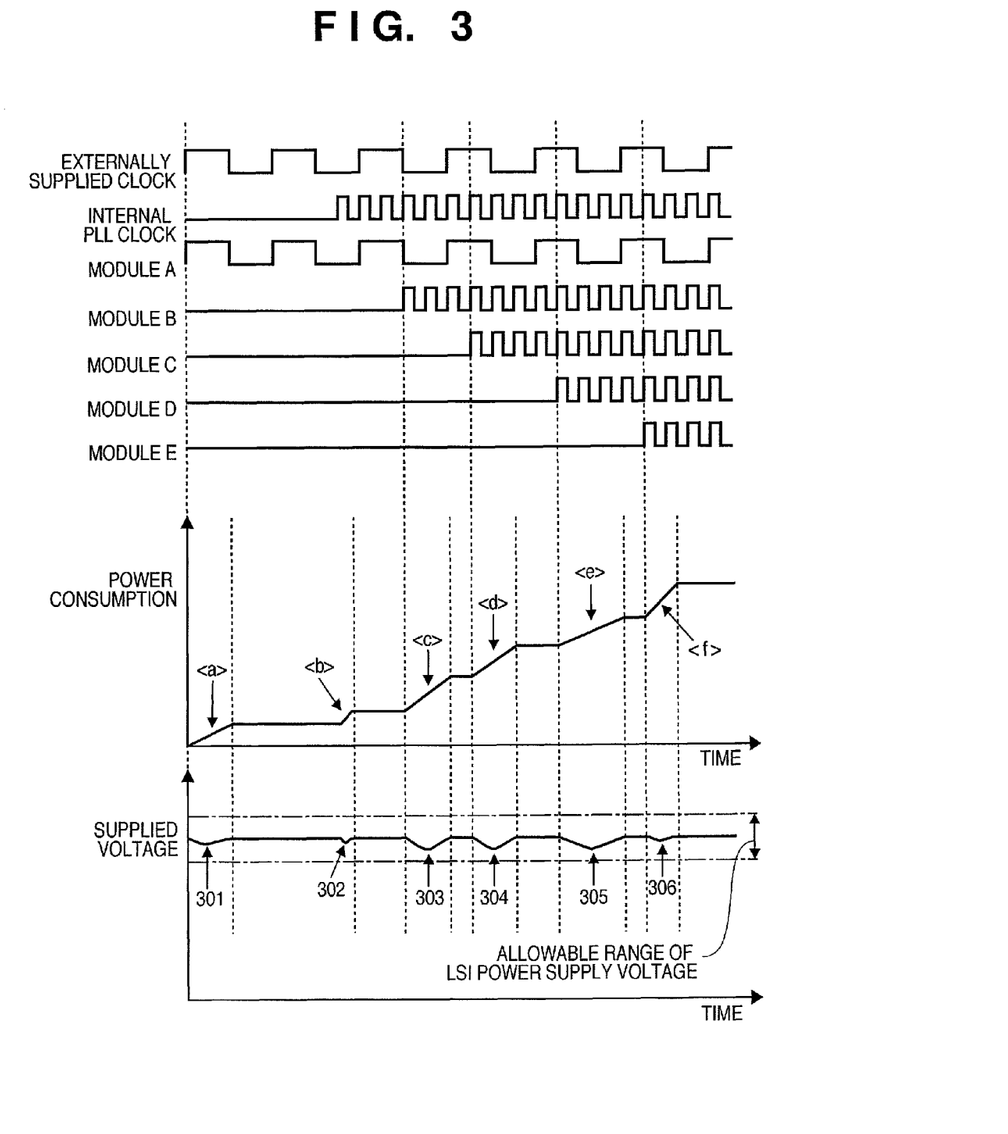
FIG. 3 is a timing chart illustrating the relationship among an internal clock signal, the power consumption and the supplied voltage during execution of processing.

Processing executed by the system according to this embodiment will be described next with reference to FIGS. 2 and 3. FIG. 2 is a flowchart illustrating processing executed by the module A 109 in the system according to this embodiment, and FIG. 3 is a timing chart illustrating the relationship among an internal clock signal, the power consumption and the supplied voltage during the execution of processing.

First, the LSI chip 114 is supplied with power from the power supply circuit 102 and with a clock signal from the clock signal generating circuit 101 (steps S101, S102). Within the LSI chip 114 at this time, it is assumed that only the module A is supplied with the clock signal. At this time there is no large fluctuation in power consumption and no accompanying large fluctuation in the supplied voltage (<a> and 301 in FIG. 3).

Next, at step S103, the module A 109 waits until a fluctuation in power consumption stabilizes. The fact that a fluctuation in power consumption has stabilized can be detected based upon the fact that the amplitude of fluctuation in power consumption has fallen within a prescribed range of values, by way of example. If the fluctuation in power consumption in the LSI chip 114 has stabilized ("YES" at step S103), then the setting of the PLL 103 is performed by the module A 109 at step S104 and the clock signal is output from the PLL 103. A fluctuation in power consumption in the LSI chip 114 at this time is due to the supply of the output clock signal of the PLL 103 to the clock gate circuits B to E (105 to 108) (<b> in FIG. 3). As a consequence, there is no large fluctuation in the supplied voltage (302 in FIG. 3).

Next, at step S105, the module A 109 waits until the fluctuation in power consumption stabilizes. If the fluctuation in power consumption in the LSI chip 114 has stabilized ("YES" at step S105), then the clock-gate control circuit 104 is set by the module A 109 so as to start the supply of the clock signal from the clock gate circuit B 105 to the module B 110 (step S106). A fluctuation in power consumption in the LSI chip 114 at this time is due to the supply of the clock signal from the PLL 103 to the module B 110 (<c> in FIG. 3). As a consequence, there is no large fluctuation in the supplied voltage (303 in FIG. 3).

Next, at step S107, the module A 109 waits until the fluctuation in power consumption stabilizes. If the fluctuation in power consumption in the LSI chip 114 has stabilized ("YES" at step S107), then the clock-gate control circuit 104 is set by the module A 109 so as to start the supply of the clock signal from the clock gate circuit C 106 to the module C 111 (step S108). A fluctuation in power consumption in the LSI chip 114 at this time is due to supply of the clock signal from the PLL 103 to the module C 111 (<d> in FIG. 3). As a consequence, there is no large fluctuation in the supplied voltage (304 in FIG. 3).

Next, at step S109, the module A 109 waits until the fluctuation in power consumption stabilizes. If the fluctuation in power consumption in the LSI chip 114 has stabilized ("YES" at step S109), then the clock-gate control circuit 104 is set by the module A 109 so as to start the supply of the clock signal from the clock gate circuit D 107 to the module D 112 (step S110). A fluctuation in power consumption in the LSI chip 114 at this time is due to supply of the clock signal from the PLL 103 to the module D 112 (<e> in FIG. 3). As a consequence, there is no large fluctuation in the supplied voltage (305 in FIG. 3).

Next, at step S111, the module A 109 waits until the fluctuation in power consumption stabilizes. If the fluctuation in power consumption in the LSI chip 114 has stabilized ("YES" at step S111), then the clock-gate control circuit 104 is set by the module A 109 so as to start the supply of the clock signal from the clock gate circuit E 108 to the module E 113 (step S112). A fluctuation in power consumption in the LSI chip 114 at this time is due to supply of the clock signal from the PLL 103 to the module E 113 (<f> in FIG. 3). As a consequence, there is no large fluctuation in the supplied voltage (306 in FIG. 3).

Thus, in the system according to this embodiment, the supply of a clock signal to each of the modules 110 to 113 of the LSI chip 114 is performed in a step-wise fashion. As a result, it is possible to prevent an LSI malfunction by suppressing a sudden fluctuation in LSI power consumption and exercising control in such a manner that a change in voltage in the external power supply circuit 102 will fall within the stipulated range of voltage fluctuation of the LSI chip.

In the conventional arrangement, the supply of the clock signal to all of the modules 110 to 113 is started simultaneously or terminated simultaneously. Power consumption therefore fluctuates sharply at the start or termination of supply of the clock signal. As a result, the voltage of the external power supply circuit 102 fluctuates greatly and an LSI malfunction may occur. By contrast, according to this embodiment, the timing of supply of the clock signal is controlled for each individual one of the modules 110 to 113 and therefore the voltage of the external power supply circuit 102 is prevented from fluctuating significantly.

In the arrangement described above, the modules are supplied with the clock signal successively. That is, the module that starts being supplied with the clock signal is changed over one at a time in order. However, so long as the fluctuation in voltage falls within the stipulated range of LSI voltage fluctuation, it does not matter if the clock signal is supplied to or cut off from a plurality of modules.

Further, in the arrangement described above, after supply of the clock signal to a module is started, supply of the clock signal to another module begins after stabilization of power consumption is detected. However, rather than detecting stabilization of power consumption, an opportunity to supply the clock signal to another module may be when a prescribed length of time elapses following the start of the supply of the clock signal to the first-mentioned module.

The embodiment has been described taking as an example operation in a case where the supply of the system clock signal to the modules B to E (110 to 113) is started. However, a sudden fluctuation in LSI power consumption can be suppressed by similar processing also in a case where the supply of voltage to the interior of the LSI chip is turned on and off or a case where a power saving mode is changed over. In accordance with this processing, control is performed in such a manner that a change in voltage in the external power supply circuit falls within the stipulated range of the LSI voltage fluctuation, thereby making it possible to prevent an LSI malfunction.

Figure 7:
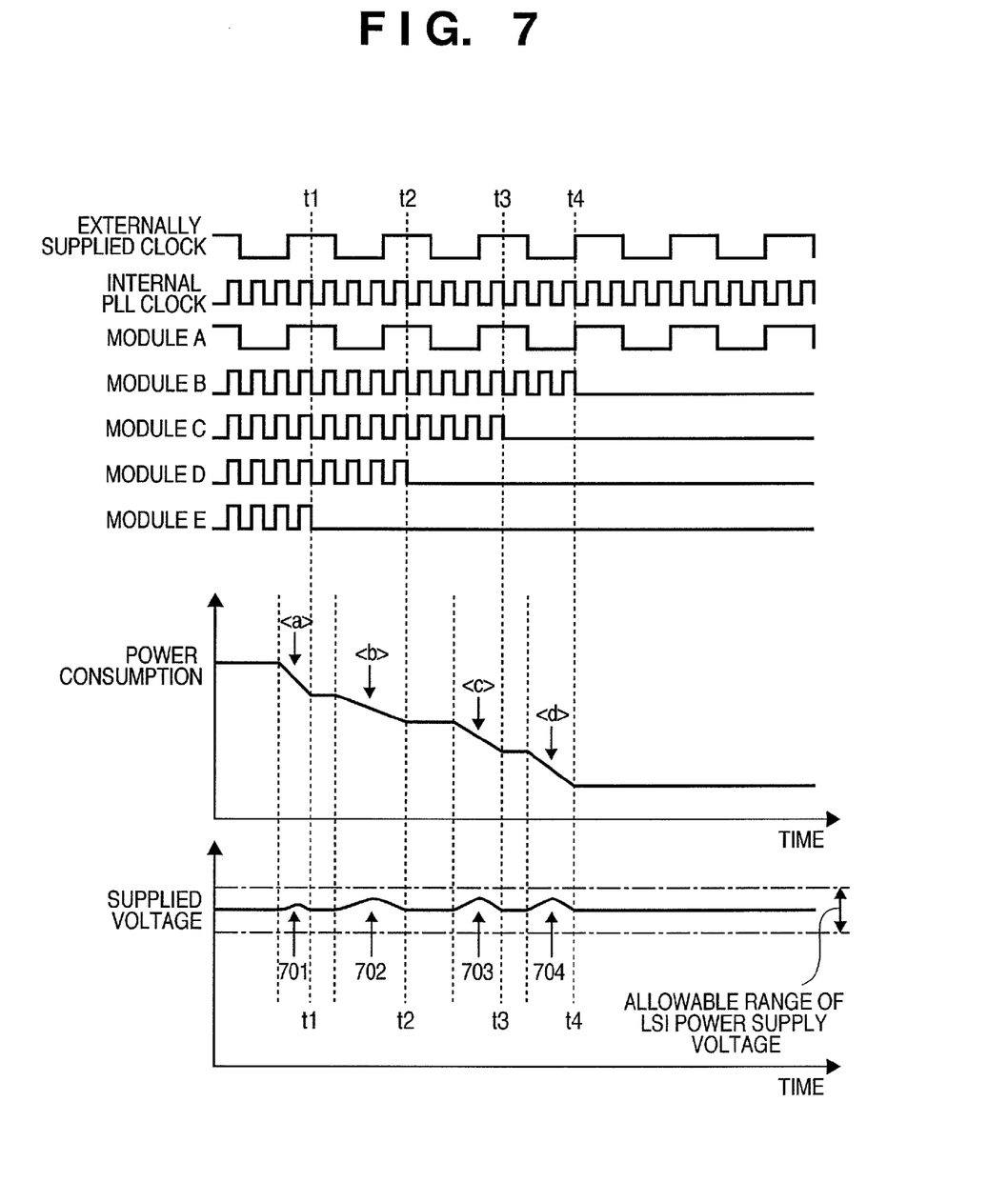
FIG. 7 is a timing chart illustrating the relationship among an internal clock signal, the power consumption and the supplied voltage in a case where supply of a clock signal is terminated.

An overview of processing in a case where supply of the clock signal is terminated will be described as one example. FIG. 7 is a timing chart illustrating the relationship among an internal clock signal, the power consumption and the supplied voltage in a case where supply of a clock signal is terminated. As shown in FIG. 7, the clock signal is being supplied to all modules B to E (110 to 113) prior to time t1. The supply of the clock signal to module E 113 is terminated at time t1. In this case, the termination of the supply of the clock signal is performed solely with regard to module E 113 and hence there is no sudden fluctuation in power consumption, as indicated at <a> in FIG. 7, and no great fluctuation in the supplied voltage (701 in FIG. 7). Similarly, the supply of the clock signal to modules D, C, B (112, 111, 110) is terminated successively at times t2, t3, t4, respectively. Consequently, in regard to termination of the supply of the clock signal to each of the modules, power consumption does not fluctuate suddenly, as indicated at <b> to <d> in FIG. 7, and there is no large fluctuation in the supplied voltage (701 to 704). Accordingly, control is performed in such a manner that a change in voltage in the external power supply circuit falls within the stipulated range of the LSI voltage fluctuation, thereby making it possible to prevent an LSI malfunction.

It can be so arranged that similar processing is executed also in changing over between the operation in a power saving mode, such as an operation at a frequency lower than that of normal operation or operation of only some functions, and normal operation or halting of operation. In accordance with such an arrangement, control is performed in such a manner that a change in voltage in the external power supply circuit falls within the stipulated range of LSI voltage fluctuation, thereby making it possible to prevent an LSI malfunction.

Second Embodiment

In the first embodiment, the timing of the supply of a clock signal is controlled on a module-by-module basis, thereby exercising control in such a manner that the range of fluctuation in the driving voltage will not exceed a predetermined range. Described in a second embodiment is an arrangement in which the frequency of the clock signal is changed in a stepwise fashion, thereby performing control in such a manner that the range of fluctuation in the driving voltage will not exceed a predetermined range. This embodiment will be described taking as an example a case where the system clock signal is supplied by turning on the applied power supply voltage. As will be described later, by executing similar processing also in changing over to another operating state, control is exercised in such a manner that the range of fluctuation in the power supply voltage will not exceed a predetermined range.

Figure 4:
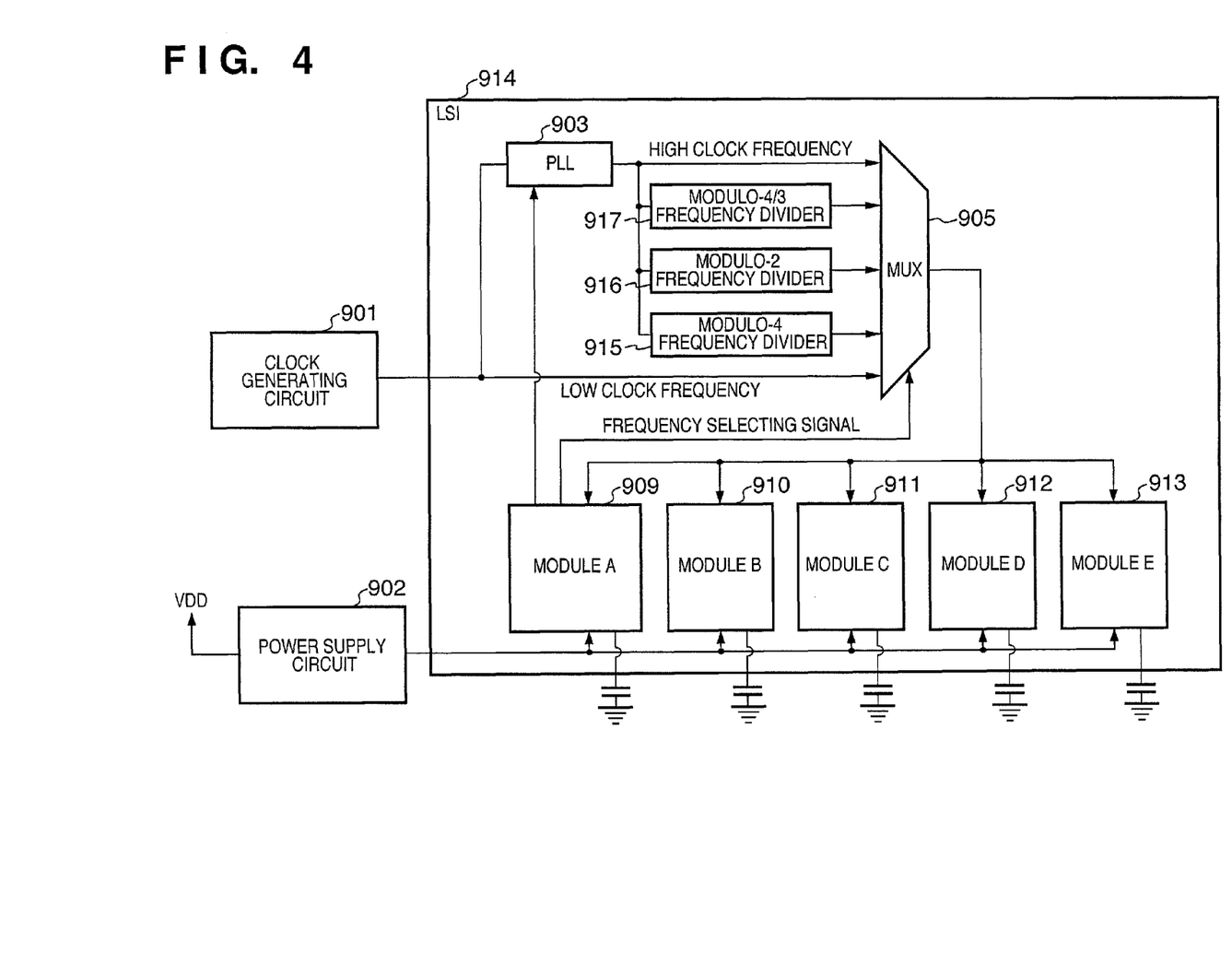
FIG. 4 is a block diagram illustrating the overall configuration of a system according to a second embodiment of the present invention.

FIG. 4 is a block diagram illustrating the overall configuration of a system according to the second embodiment of the present invention. The system according to this embodiment comprises an LSI chip 914, a clock signal generating circuit 901 for generating a clock signal supplied to the LSI chip 914, and a power supply circuit 902 for supplying power to the LSI chip 914.

The LSI chip 914 has the following components:
five internal modules (operation unit) A to E (909 to 913);
a PLL (output unit) 903;

frequency dividing circuits (frequency dividers) 915 to 917 for frequency-dividing the output clock signal of the PLL 903; and a clock selecting circuit (MUX: multiplexer) 905.

The setting of the PLL 903 and the clock selecting circuit 905 is carried out by the module A 909. Further, as illustrated in FIG. 4, the frequency dividing circuits 915 to 917 are a modulo-4 frequency divider, a modulo-2 frequency divider and a modulo-4/3 frequency divider, respectively. The clock selecting circuit 905 receives as inputs a high-frequency clock signal that is output from the PLL 903, the frequency-divided clock signals obtained from the frequency dividers 915 to 917, and a low-frequency clock signal that is output from the clock signal generating circuit 901. On the basis of a frequency selecting signal that enters from the module A 909, the clock selecting circuit 905 outputs any one of the clock signals that is input thereto.

The module A 909, the frequency dividers 915 to 917 and the clock selecting circuit 905 function as a supply unit adapted to supply the clock signal, which is output from the PLL 903, to the modules B to E (910 to 913). The module A 909, the frequency dividers 915 to 917 and the clock selecting circuit 905 control the supply of the clock signal to the modules B to E (910 to 913) in such a manner that the range of fluctuation in the driving voltage will not exceed a predetermined range. That is, according to this embodiment, the supply of the clock signal to the modules B to E (910 to 913) is controlled in such a manner that the range of fluctuation in the power supply voltage will not exceed a predetermined range even if there is a changeover in the operating state of the LSI. This prevents an LSI malfunction. In this embodiment, the frequency of the clock signal is changed in a stepwise manner, thereby suppressing a sudden fluctuation in the power supply voltage.

Although this embodiment is described taking as an example a case where there are four modules as the operation unit, the number is not limited to four so long as there are a plurality of the modules. Further, the number of frequency dividers 915 to 917 and the dividing ratios thereof are not limited to those illustrated above by way of example.

Figure 5:
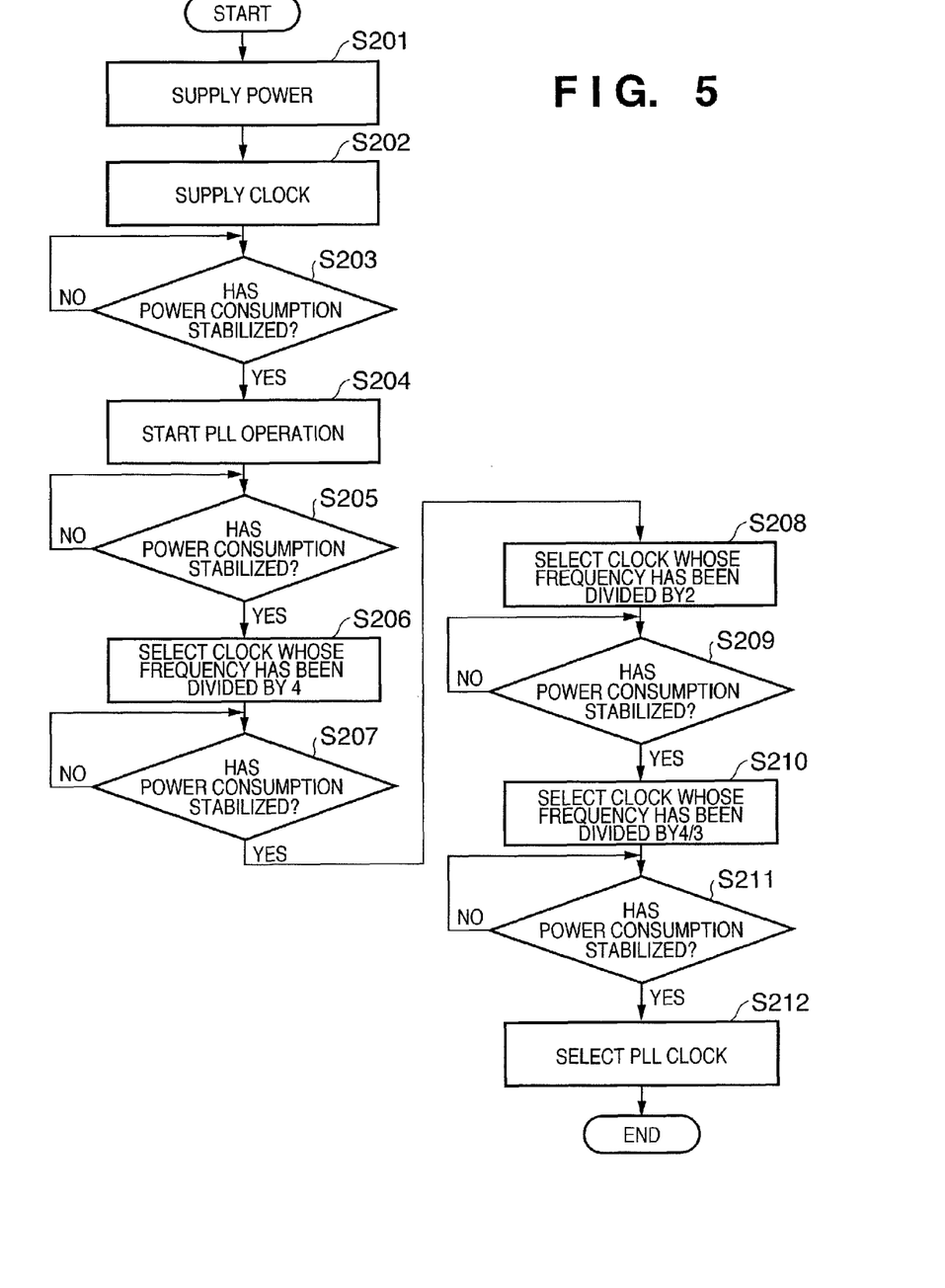
FIG. 5 is a flowchart illustrating processing executed by a module in the system according to the second embodiment.
Figure 6:
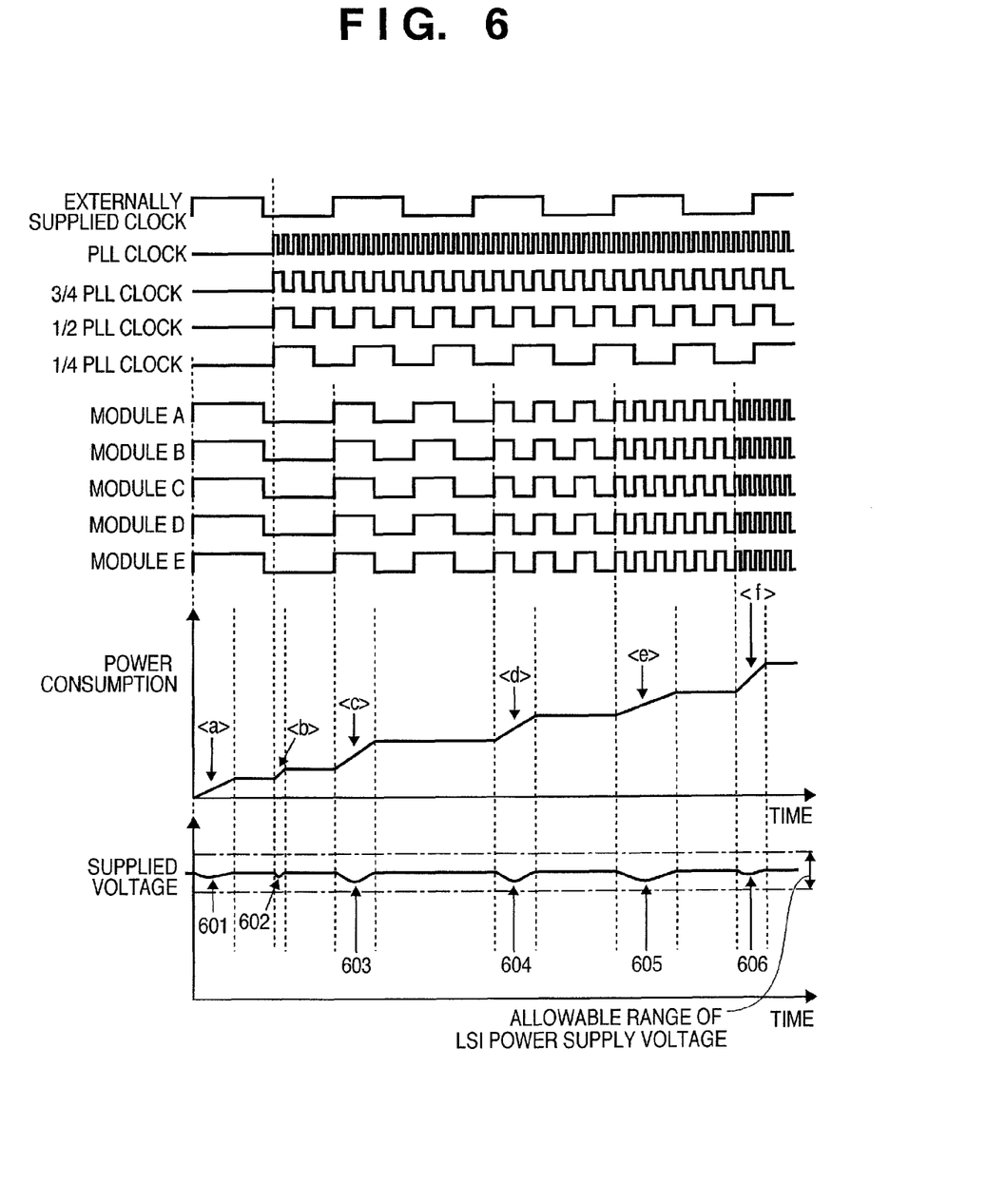
FIG. 6 is a timing chart illustrating the relationship among an internal clock signal, the power consumption and the supplied voltage during execution of processing.

Processing executed by the system according to this embodiment will be described next with reference to FIGS. 5 and 6. FIG. 5 is a flowchart illustrating processing executed by the system according to this embodiment, and FIG. 6 is a timing chart illustrating the relationship among an internal clock signal, the power consumption and the supplied voltage during execution of processing.

First, the LSI chip 914 is supplied with power from the power supply circuit 902 and with a clock signal from the clock signal generating circuit 901 (steps S201, S202). Within the LSI chip 914 at this time, it is assumed that all of the modules A to E (909 to 913) are supplied by the clock selecting circuit 905 with the externally supplied clock signal. Since the externally supplied clock signal is a low-frequency clock signal, there is no large fluctuation in power consumption and no accompanying large fluctuation in the supplied voltage (<a> and 601 in FIG. 6).

Next, at step S203, the module A 909 waits until a fluctuation in power consumption stabilizes. The fact that a fluctuation in power consumption has stabilized can be detected based upon the fact that the amplitude of fluctuation in power consumption has fallen within a prescribed range of values, by way of example. If the fluctuation in power consumption in the LSI chip 914 has stabilized ("YES" at step S203), then the setting of the PLL 903 is performed by the module A 909 at step S204 and the clock signal is output from the PLL 903. A fluctuation in power consumption in the LSI chip 914 at this time is due to the supply of the output clock signal of the PLL 903 to the frequency dividers 915 to 917 and to the clock selecting circuit 905, and also due to the supply of the output clock signals from the frequency dividers 915 to 917 to the clock selecting circuit 905 (<b> in FIG. 6). As a consequence, there is no large fluctuation in the supplied voltage (602 in FIG. 6).

Next, at step S205, the module A 909 waits until the fluctuation in power consumption stabilizes. If the fluctuation in power consumption in the LSI chip 114 has stabilized ("YES" at step S205), then the clock selecting circuit 905 is set by the module A 909 so as to select the PLL clock signal whose frequency has been divided by 4 by the modulo-4 frequency divider 915 (step S206). A fluctuation in power consumption in the LSI chip 914 at this time is due to supply of the clock signal, whose frequency is ¼ the frequency of the PLL clock signal, to all of the modules A to E (909 to 913) (<c> in FIG. 6). As a consequence, there is no large fluctuation in the supplied voltage (603 in FIG. 6).

Next, at step S207, the module A 909 waits until the fluctuation in power consumption stabilizes. If the fluctuation in power consumption in the LSI chip 114 has stabilized ("YES" at step S207), then the clock selecting circuit 905 is set by the module A 909 so as to select the PLL clock signal whose frequency has been divided by 2 by the modulo-2 frequency divider 916 (step S208). A fluctuation in power consumption in the LSI chip 914 at this time is due to supply of the clock signal, whose frequency is ½ the frequency of the PLL clock signal, to all of the modules A to E (909 to 913) (<d> in FIG. 6). As a consequence, there is no large fluctuation in the supplied voltage (604 in FIG. 6).

Next, at step S209, the module A 909 waits until the fluctuation in power consumption stabilizes. If the fluctuation in power consumption in the LSI chip 114 has stabilized ("YES" at step S209), then the clock selecting circuit 905 is set by the module A 909 so as to select the PLL clock signal whose frequency has been divided by 4/3 by the modulo-4/3 frequency divider 917 (step S210). A fluctuation in power consumption in the LSI chip 914 at this time is due to the supply of the clock signal, whose frequency is ¾ the frequency of the PLL clock signal, to all of the modules A to E (909 to 913) (<e> in FIG. 6). As a consequence, there is no large fluctuation in the supplied voltage (605 in FIG. 6).

Next, at step S211, the module A 909 waits until the fluctuation in power consumption stabilizes. If the fluctuation in power consumption in the LSI chip 114 has stabilized ("YES" at step S211), then the clock selecting circuit 905 is set by the module A 909 so as to select the output clock signal of the PLL 903 (step S212). A fluctuation in power consumption in the LSI chip 914 at this time is due to supply of the output clock signal of PLL 903 to all of the modules A to E (909 to 913) (<f> in FIG. 6). As a consequence, there is no large fluctuation in the supplied voltage (606 in FIG. 6).

Thus, in the system according to this embodiment, clock frequency supplied to all module is changed in a step-wise fashion. As a result, it is possible to prevent an LSI malfunction by suppressing a sudden fluctuation in LSI power consumption and exercising control in such a manner that a change in the voltage in the external power supply circuit will fall within the stipulated range of the voltage fluctuation of the LSI chip.

The foregoing has been described taking as an example operation in a case where the system clock signal supplied to modules B to E (910 to 913) is raised in stages. However, by lowering the system clock signal in stages by a similar processing, a sudden fluctuation in LSI power consumption can be suppressed when the system clock signal is changed. In accordance with such processing, control is performed in such a manner that a change in voltage in the external power supply circuit falls within the stipulated range of LSI voltage fluctuation, thereby making it possible to prevent an LSI malfunction.

Further, in the arrangement described above, a clock signal is selected. Then, after stabilization of power consumption is detected, selection of a clock signal is performed again. However, rather than detecting stabilization of power consumption, an opportunity to perform further selection of a clock signal may be when a prescribed length of time elapses following selection of the first-mentioned clock signal.

Other Embodiments

In the first embodiment, timing of the supply of a clock signal is controlled on a module-by-module basis, thereby exercising control in such a manner that the range of fluctuation in the driving voltage will not exceed a predetermined range. In the second embodiment, the frequency of the clock signal is changed in a stepwise fashion, thereby performing control in such a manner that the range of fluctuation in the driving voltage will not exceed a predetermined range.

However, the methods of controlling the supply of the clock signal to the modules is not limited to these methods so long as the range of fluctuation of the driving voltage does not exceed a predetermined range. For example, the method according to the first embodiment and the method according to the second embodiment can be used in combination. That is, it can be so arranged that while the frequency of the clock signal is changed in a step-wise fashion, the timing of supply of the clock signal is controlled module by module. In accordance with such an arrangement, a fluctuation in power consumption can be smoothened further and a change in voltage in the external power supply can be reduced further.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-055017, filed Mar. 1, 2006, which is hereby incorporated by reference herein in its entirety.

What is claimed is:

1. A semiconductor integrated circuit comprising:
a plurality of internal blocks connected to a power supply circuit in parallel;
a clock generating unit configured to generate a clock signal;
a phase locked loop configured to receive the clock signal of the clock generating unit;
a clock supply unit configured to receive a clock signal from the phase locked loop and configured to supply clock signals to each of the plurality of internal blocks, the clock supply unit including
a control unit, and
a clock selecting unit connected to the clock generating unit, the control unit, and each of the plurality of internal blocks, the clock selecting unit being configured to change the frequency of the clock signal output to each of the plurality of internal blocks in a stepwise manner so as to supply a clock signal of a first frequency to the plurality of internal blocks, thereafter to supply a clock signal of a second frequency to the plurality of internal blocks, and thereafter to supply a clock signal of a third frequency to the plurality of internal blocks; and
a detection unit configured to detect that a fluctuation in power consumption in the semiconductor integrated circuit is stabilized;
the control unit being configured to
set the phase locked loop,
control the frequency of the clock signals supplied to the plurality of internal blocks by the clock selecting unit,
control the timing at which the clock selecting unit supplies the clock signals to the plurality of internal blocks, and
wait until the detection unit detects that the fluctuation in power consumption in the semiconductor integrated circuit is stabilized before each occurrence of the control unit instructing the clock selecting unit to supply a clock signal of a new frequency to the plurality of internal blocks.

2. The circuit according to claim 1, wherein said supply unit supplies the clock signal successively to each of the plurality of internal blocks in such a manner that power supply voltage supplied from an external power supply circuit will not exceed an allowable range of power supply voltages of the semiconductor integrated circuit owing to a fluctuation in the load on the semiconductor integrated circuit accompanying a change in operating state of the semiconductor integrated circuit.

3. The circuit according to claim 1, wherein said supply unit supplies the clock signal successively to each of the plurality of internal blocks in such a manner that a range of fluctuation in the driving voltage of said semiconductor integrated circuit will not exceed a predetermined range.

4. The circuit according to claim 1, wherein said supply unit supplies the clock signal successively to each of the plurality of internal blocks in the course of changing from a state in which the clock signal is not supplied to the plurality of internal blocks to a state in which the clock signal is supplied to the plurality of internal blocks.

5. The circuit according to claim 1, wherein the frequency of the clock signal supplied to the supply unit is lower than the frequency of the clock signal supplied to the plurality of internal blocks.

6. The circuit according to claim 1, wherein said control unit is a first unit to receive a clock signal from a clock generating circuit in the semiconductor integrated circuit.

7. A method of supplying a clock signal to a plurality of internal blocks connected to a power supply circuit in parallel and provided in a semiconductor integrated circuit, said method comprises steps of:
generating a clock signal with a clock generating unit and supplying the clock signal to a phase locked loop;
supplying clock signals to each of the plurality of internal blocks with a clock supply unit receiving a clock signal from the phase locked loop;
changing the frequency of the clock signal supplied to each of the plurality of internal blocks with a clock selecting unit of the clock supply unit in a stepwise manner so as to supply a clock signal of a first frequency to the plurality of internal blocks, thereafter to supply a clock signal of a second frequency to the plurality of internal blocks, and thereafter to supply a clock signal of a third frequency to the plurality of internal blocks, the clock selecting unit being connected to the clock generating unit, each of internal blocks, and a control unit of the clock supply unit that sets the phase locked loop, controls the frequency of the clock signals supplied to the internal blocks by the clock selecting unit, and controls the timing at which the clock selecting unit supplies the clock signals to the internal blocks;

detecting that a fluctuation in power consumption in the semiconductor integrated circuit is stabilized; and waiting until said detecting step detects that a fluctuation in power consumption in the semiconductor integrated circuit is stabilized before each occurrence of the control unit instructing the clock selecting unit to supply a clock signal of a new frequency to the plurality of internal blocks.

8. A circuit comprising:

a plurality of internal blocks connected to a power supply circuit in parallel;

a clock generating unit configured to generate a clock signal;

a phase locked loop configured to receive the clock signal of the clock generating unit;

a clock supply unit configured to receive a clock signal from the phase locked loop and configured to supply clock signals to each of the plurality of internal blocks, the clock supply unit including a control unit, and a clock selecting unit connected to the clock generating unit, the control unit, and each of the plurality of internal blocks, the clock selecting unit being configured to change the frequency of the clock signal output to each of the plurality of internal blocks in a stepwise manner so as to supply a clock signal of a first frequency to the plurality of internal blocks, thereafter to supply a clock signal of a second frequency to the plurality of internal blocks, and thereafter to supply a clock signal of a third frequency to the plurality of internal blocks;

a detection unit configured to detect that a fluctuation in power consumption in the semiconductor integrated circuit is stabilized;

the control unit being configured to set the phase locked loop, control the frequency of the clock signals supplied to the plurality of internal blocks by the clock selecting unit, control the timing at which the clock selecting unit supplies the clock signals to the plurality of internal blocks, and wait until the detection unit detects the fluctuation in power consumption of the semiconductor integrated circuit is stabilized before each occurrence of the control unit instructing the clock selecting unit to supply a clock signal of a new frequency to the plurality of internal blocks.

* * * * *